May 30, 1933.  M. MORRISON  1,911,962

RADIOGRAPH ILLUMINATOR

Filed Aug. 1, 1931

INVENTOR
MONTFORD MORRISON
BY
ATTORNEY

Patented May 30, 1933

1,911,962

UNITED STATES PATENT OFFICE

MONTFORD MORRISON, OF MONTCLAIR, NEW JERSEY, ASSIGNOR TO WESTINGHOUSE X-RAY COMPANY, INC., A CORPORATION OF DELAWARE

RADIOGRAPH ILLUMINATOR

Application filed August 1, 1931. Serial No. 554,506.

My invention relates to radiograph illuminator or viewing boxes commonly utilized for studying radiographic exposures and has particular reference to a device of this general character in which the illumination is equally distributed over the entire surface of the translucent window and consequently the radiographic film.

Heretofore in the art such devices have been provided in which the concentration of light is greater at the center of the film than over the remaining portions thereof rendering detailed study of the entire films by the roentgenologist difficult or impossible. When in such devices an effort has been made to more equally distribute the light it has resulted in increasing the illumination of the area of the film to some extent but shadows have invariably appeared in other portions of the film with the same perplexing result when an endeavor to study the details of the entire film is made.

It is, therefore, an object of my invention to provide a radiographic illuminator in which the illumination is equally distributed over the entire surface of the radiographic film.

Another object of my invention is the provision of a radiograph illuminator in which no shadows are projected upon the translucent window and consequently upon the film.

Another object of my invention is the provision of a radiograph illuminator in which all direct rays from the source of illumination are prevented from being projected upon the translucent window and radiographic film.

Still further objects of my invention will become apparent to those skilled in the art by reference to the accompanying drawing wherein.

Figure 4:
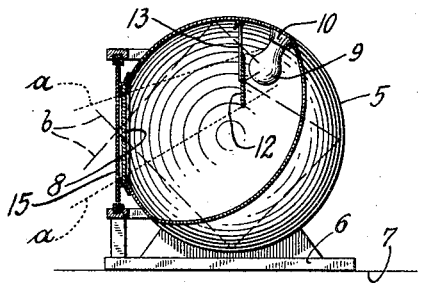
Figure 4 is a side view of a spherical form which my invention may take with a portion thereof broken away to better illustrate the several parts.
Figure 1:
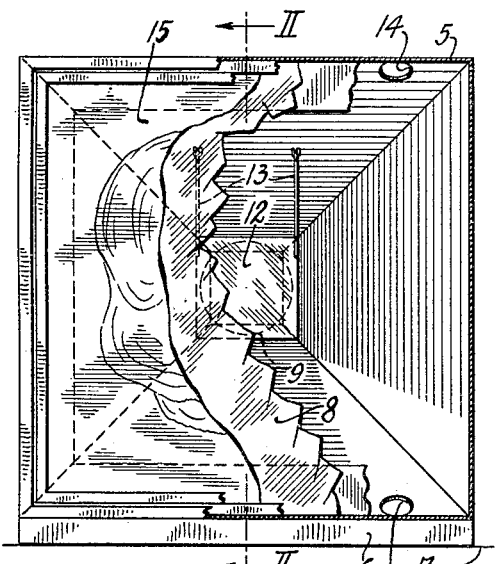
Figure 1 is a front elevational view of a pyramidical form which my invention may take with a portion thereof broken away to better illustrate the parts.
Figure 2:
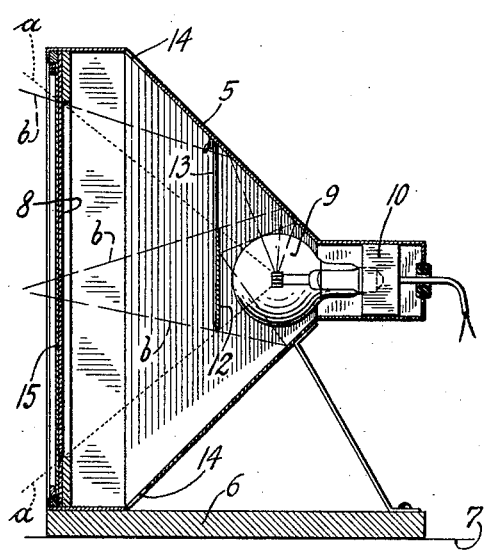
Figure 2 is a side sectional view taken on the line II—II of Figure 1.
Figure 3:
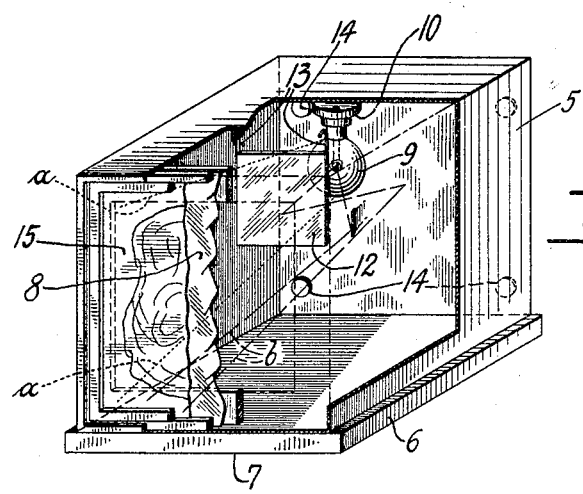
Figure 3 is a perspective view of a cubical form of my device with a portion thereof broken away to better illustrate the several parts.

Referring now to the drawing in detail I have shown in the several figures an opaque casing 5 supported upon a suitable base member 6 and the device arranged to rest upon a table or bracket 7. A translucent window 8 of ground, opalescent, or colored glass is provided in the opaque casing 5 and a suitable source of illumination such as an incandescent lamp 9, is secured in a socket 10, and is arranged to receive electrical energy from a suitable source (not shown) in the usual manner.

A screen 12 of a reflecting metal or coated with a reflecting surface is disposed between the source of illumination 9 and the translucent window 8. This screen may be supported in a suitable manner, such as by hinged supporting wires 13 thus permitting the screen to be readily moved in order to give access to the lamp 9 for replacement purposes.

The screen 12 is of an area proportional to the area of the translucent window 8 and is so positioned relative to the source 9 and the window 8 that all direct rays are prevented from being projected upon the window. This may readily be seen by the lines $a$—$a$ which are, at the position of the window 8, of a greater area than the window. The entire interior of the casing 5 being of a reflecting metal or provided with a reflecting surface as well as the screen 12 enables only reflected rays to be projected upon the window 8.

In this maner the direct rays emanating from the source 9 strike the interior of the casing and are reflected against the translucent window or strike the screen 12, are then reflected against the casing, and are again reflected by the latter to the translucent window 8 as shown by the lines $b$—$b$.

Although no direct rays from the source are projected over the entire area of the window a uniform distribution of illumination with an entire absence of shadows of every description results over the entire area of the window 8. In order to properly ventilate the viewing boxes small openings, such as shown at 14, may be provided in a suitable location where they will not be in a position to be struck by light rays.

When the usual radiographic film shown at 15 is positioned in front of the translucent window 8 there is likewise an equal distribution of illumination in back of the entire area of the film 15 which enables the roentgenologist to make a detailed diagnosis of the entire film.

My device is very readily adaptable to stereoscopic devices in which two radiograph illuminators are employed. In apparatus of this character radiographic exposures which have been taken from two distinct angles are viewed through a binocular device and gives a superimposed effect of the two pictures. By employing an illuminator made in accordance with my invention the resulting superimposed image is clear and distinct in every detail over the entire area of the film corresponding to the area of the translucent window.

It can thus be readily seen by those skilled in the art that I have provided a radiograph illuminator in which the distribution of illumination is uniform over the entire area of the translucent window and in which there is an entire absence of shadows due to no direct rays being projected from the source of illumination upon the translucent window.

Although I have shown and described one specific embodiment of my invention I do not desire to be limited thereto as various other modifications of the same may be made without departing from the spirit and scope of the appended claims.

What is claimed is:

1. A radiograph illuminator for examining X-ray photographs comprising, an opaque casing provided with a flat translucent window of relatively large area, said casing having a plurality of divergent walls having reflecting surfaces, a point source of illumination interiorly positioned in said casing to illuminate the entire area of said translucent window, a reflecting screen interposed between said point source of illumination and said translucent window, said screen being supported by one of said walls and being located relatively close to said point source of illumination, said screen having an area proportional to the area of said window and being positioned relative to the point source of illumination and said window to prevent direct rays from said point source from being projected upon said window and to uniformly distribute the intensity of said point source of illumination over the entire useful area of said translucent window.

2. A radiograph illuminator for examining X-ray photographs comprising, an opaque casing having a reflecting surface over its entire interior and provided with a flat translucent window of relatively large area, a point source of illumination disposed within said casing, said casing having a plurality of divergent walls and another wall, said other wall being at an obtuse angle to said divergent walls and substantially normal to said translucent window, and a reflecting screen, interposed between said point source of illumination and said window, having an area proportional to the area of said window and spaced relative thereto for preventing direct rays from said point source from being projected upon said window, said screen supported by and depending from one of said diverging walls, said screen cooperating with the interior of said casing for causing a uniform distribution of reflected rays to be projected over the entire area of said window to decrease the differences in intensity of the illumination from said point source over the entire useful area of said translucent window.

In testimony whereof, I have hereunto subscribed my name this 30th day of July 1931.

MONTFORD MORRISON.